Jan. 3, 1961 W. F. DERYLO 2,966,809
ELECTROMAGNETIC SPEED CHANGER
Filed March 21, 1958

INVENTOR.
WALTER F. DERYLO

United States Patent Office 2,966,809
Patented Jan. 3, 1961

2,966,809
ELECTROMAGNETIC SPEED CHANGER
Walter F. Derylo, Grand Rapids, Mich., assignor to Lear, Incorporated
Filed Mar. 21, 1958, Ser. No. 722,939
4 Claims. (Cl. 74—781)

This invention relates to a variable speed device and, more particularly, to a two-speed transmission. When using gear reduction units for instrument application, the unit must be small in size, simple in construction and economical. Also, the unit must be capable of high reduction ratios, e.g., 100 to 1.

In the past, in order to construct a unit capable of two outputs, one being a high reduction of the input and the other being a low reduction or equal to the input, an internal ring gear was required; or when the internal ring gear was not used, many gears were required. An internal ring gear is relatively expensive to manufacture and the use of several gears is also relatively expensive, complex and makes the unit relatively large.

Therefore, it is an object of this invention to provide a two-speed transmission which utilizes a smaller number of parts, is compact and simple in construction.

Another object of this invention is to provide an electromechanical two-speed gear reduction unit which has a high gear reduction ratio with an electrically energized coil and a direct ratio in a de-energized condition, and is small in size.

Figure 1:
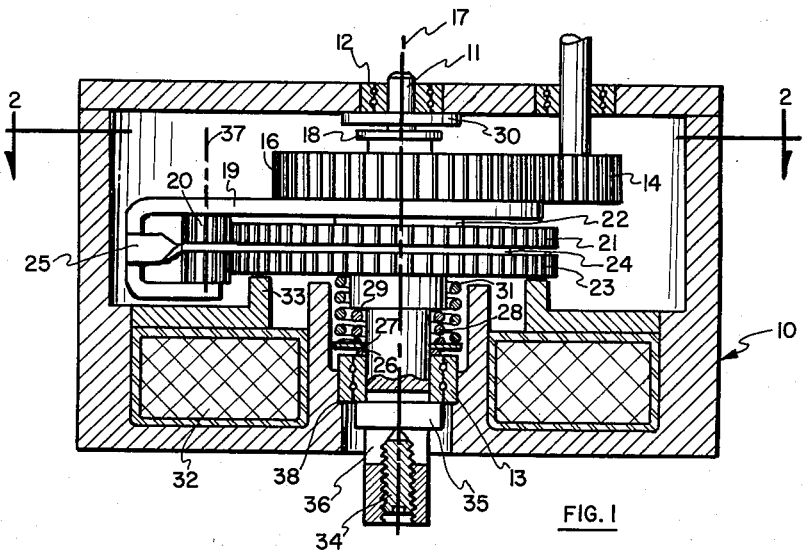
Figure 2:
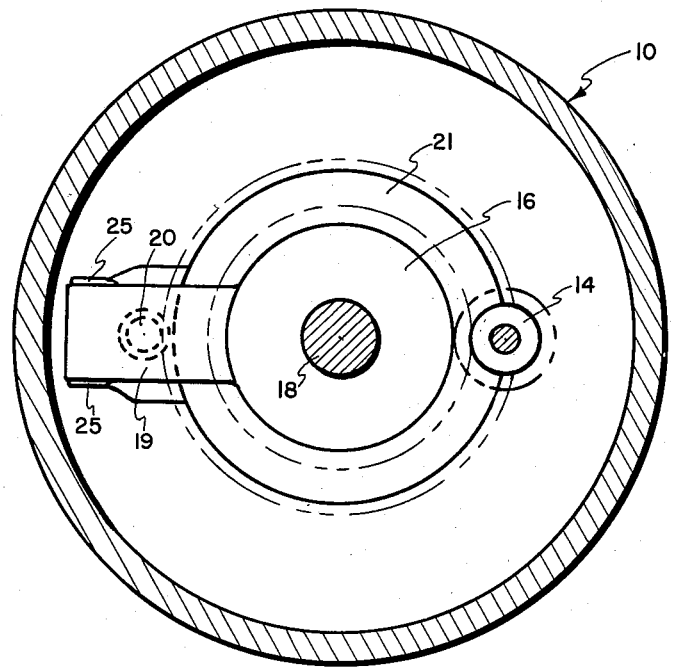

Further objects and a fuller understanding of this invention will become apparent from the following description when taken in conjunction with the drawings in which:

Fig. 1 is a cross section of the present invention; and
Fig. 2 is a view taken along the line 2—2 of Fig. 1.

Referring to the drawing, there is shown a housing 10, a shaft 11 supported within the housing 10 by bearings 12 and 13. Drive gear 14 provides the input to the unit. A driven gear 16 is meshed with gear 14 and located on the shaft 11 having rotational freedom with respect to the shaft 11 about axis 17, and is restricted longitudinally on one side by a shim 18. A carrier 19 is fixed to the driven gear 16 and carries a planet gear 20 thereon. A first sun gear 21, located on and fixed to the shaft 11, is separated from the carrier 19 and gear 16 by shoulder 22 on shaft 11. A second sun gear 23 made of magnetic material and located on the shaft 11, has rotational freedom with respect to the shaft 11 about axis 17 and is separated from the gear 21 by disc clutch 24 constructed of a non-magnetic material. The disc clutch 24 is free to rotate with respect to the shaft 11 about axis 17 and has two arms 25 extending therefrom which contact the carrier 19 such that rotation of the carrier 19 causes rotation of the disc clutch 24. The planet gear 20 is meshed with the gears 21 and 23. The gears 21 and 23 have the same pitch diameter but an unequal number of teeth, e.g., gear 21 has 100 teeth and gear 23 has 99 teeth. Shims 26 and 27 are urged against the bearing 13 by spring 28. The spring 28 also abuts the shoulder 29 of shaft 11 and urges the bushing 30, which is fixed to shaft 11, against the housing 10. A second spring 31, inclosing the first spring 28, also has one end contacting the shim 26 and the other end contacts and urges the sun gear 23 and clutch disc 24 against the first sun gear 21. A wound wire coil 32 is positioned in the housing 10 such that when the coil is electrically energized, the gear 23 is attracted to the flange 33 of housing 10. The spring 28 prevents movement of shaft 11 when the coil is electrically energized. A set screw 34 is threaded into the shaft 11 and comes in contact with a bar 35. The bar 35 is free to move within the limitations of the slot 36 in shaft 11. The bar 35 also contacts the bearing 13 and, in conjunction with the set screw 34, is used to adjust the air gap between the sun gear 23 and flange 33.

To illustrate the operation of the unit, first consider that the coil 32 is in a de-energized state. Therefore, the spring 31 urges the gear 23 and disc clutch 24 into frictional contact with the gear 21. The driving gear 14 drives gear 16 which, in turn, causes the carrier 19 to rotate about the axis 17 of shaft 11. The arms 25 of the disc clutch 24 bring about rotation of the disc clutch 24 with the carrier 19 about axis 17. The spring 31 urging the gear 23 and disc clutch 24 to be forced against the first sun gear 21 causes the gears 21 and 23 to rotate about axis 17 with the same angular speed as the carrier 19. Therefore, the gear 21, being fixed to the shaft 11, imparts rotation to the shaft 11 about axis 17 at the same speed that the gear 16 is driven by gear 14.

Consider now that the coil 32 is electrically energized. This sets up a magnetic field which attracts and locks the gear 23 to the flange 33 against the urging of spring 31. The gear 23 and clutch disc 24 are no longer under the pressure of spring 31 and, therefore, the clutch disc 24 may rotate about axis 17 without imparting rotation to either gear 21 or 23.

Now it can be seen that as the carrier 19 is driven about the axis 17, the planet gear 20 rotates about axis 38 and travels about the circumference of the gears 21 and 23. The second sun gear 23 is held stationary and has one less tooth than the first sun gear 21. Therefore, if the planet gear 20 is to circle the gears 21 and 23 for each revolution of the planet gear 20 around the sun gear 23, the first sun gear 21 will be advanced one tooth. This phenomenon is well known in the art. It follows then, that the gear 21 being fixed to the shaft 11 and advancing one tooth for every complete revolution of the planet gear 20 about axis 17 causes the shaft 11 to rotate about axis 17 at a ratio of 100 to 1. In other words, the planet gear 20 must make 100 revolutions about the gear 23 before the gear 21 will have been advanced one tooth at a time, one complete revolution. This ratio can be varied to accommodate any desired speed change by changing the number of teeth on the gears 21 and 23.

To adjust the air gap between the flange 33 and gear 23, the set screw 34 urges the bar 35, e.g., in a direction toward the bearing 13. This compresses the springs 28 and 31 and causes the bearing 13 to move away from the shoulder 38 of housing 10. The shaft 11 can then be moved in a direction to make the bearing 13 again come in contact with the shoulder 39 of housing 10. This, in turn, reduces the distance of the air gap between the flange 33 and gear 23. After such an adjustment, the shim 30 is added to maintain the shaft in the adjusted position.

Although the present invention has been described with a certain degree of particularity, it is understood that various modifications in the details and arrangements of parts may be had without departing from the spirit and scope of the invention as hereinafter claimed.

I claim:

1. A two-speed power transmission comprising a housing, a shaft supported by said housing, a driven gear positioned on said shaft having angular freedom with respect to said shaft, means for driving said driven gear, said driven gear having a carrier attached thereto and a planet gear mounted on said carrier, a first sun gear and a second sun gear mounted on said shaft and having pitch diameters of equal size such that both of said sun gears mesh with said planet gear, said first sun gear being fixed to said shaft, said second sun gear having angular freedom with respect to said shaft and being made of magnetic material, a clutch disc made of non-magnetic material positioned between said sun gears and having arms such that said clutch disc is locked with said carrier, resilient means for urging said clutch disc and said second sun gear against said first sun gear to cause simultaneous angular movement when said carrier is rotated, magnetic means for disengaging said second sun gear and said clutch disc from said first sun gear and locking said second sun gear causing said first sun gear to be rotated at a highly reduced rate of rotation in relation to the rate of rotation of said planet gear about said second sun gear.

2. A two-speed power transmission comprising a housing, a shaft supported by said housing, an input gear positioned on the same axis as said shaft having rotational freedom with respect to said shaft, a first sun gear attached to said shaft, a second sun gear made of magnetic material positioned on said shaft having rotational and longitudinal freedom with respect to said shaft, said first sun gear and said second sun gear having pitch diameters of equal length and the same rotational axis but having an unequal number of teeth, a planet gear, transported by a carrier, in mesh with said sun gears, said carrier being attached to said input gear, a clutch disc made of non-magnetic material positioned on said shaft with rotational freedom about said axis with respect to said shaft, said clutch disc having arms thereon for locking to said carrier to cause said clutch disc and said carrier to rotate as one unit, resilient means for urging said clutch disc and said second sun gear against said first sun gear to cause simultaneous angular movement of said sun gears, said carrier and said clutch disc when said carrier is rotated, magnetic means for disengaging said second sun gear and said clutch disc from said first sun gear and locking said second sun gear to said housing causing said first sun gear to be rotated at a highly reduced rate of rotation in relation to the rate of rotation of said carrier and said planet gear about said second sun gear, and means for adjusting the gap between said second sun gear and said housing when said magnetic means is in the de-energized state.

3. The device as claimed in claim 2 wherein said magnetic means comprises a wound wire coil positioned at one end of said housing and capable of magnetically attracting said sun gear.

4. A two-speed power transmission comprising a housing, a shaft supported by said housing, an input gear positioned on the same axis as said shaft having rotational freedom with respect to said shaft, a first sun gear attached to said shaft, a second sun gear made of magnetic material positioned on said shaft having rotational and longitudinal freedom with respect to said shaft, said first sun gear and said second sun gear having pitch diameters of equal length and the same rotational axis but having an unequal number of teeth, a planet gear, transported by a carrier, in mesh with said sun gears, said carrier being attached to said input gear, a clutch disc made of non-magnetic material positioned on said shaft with rotational freedom about said axis with respect to said shaft, said clutch disc having arms thereon for locking to said carrier to cause said clutch disc and said carrier to rotate as one unit, a coil spring for urging said clutch disc and said second sun gear against said first sun gear to cause simultaneous angular movement of said sun gears, said carrier and said clutch disc when said carrier is rotated, a wound wire coil positioned at one end of said housing and capable of magnetically attracting said second sun gear for disengaging said second sun gear and said clutch disc from said first sun gear and locking said second sun gear to said housing causing said first sun gear to be rotated at a highly reduced rate of rotation in relation to the rate of rotation of said carrier and said planet gear about said second sun gear, a set screw within said shaft abutting a bar located in a slot in said shaft, said bar being in a position to adjust the length of said coil spring and subsequently the gap between said second sun gear and said housing when said wire wound coil is in the de-energized state.

References Cited in the file of this patent
UNITED STATES PATENTS

| | | |
|---|---|---|
| 1,864,870 | Stoker | June 28, 1932 |
| 2,611,886 | Kamper | Sept. 23, 1952 |
| 2,780,200 | Winters | Feb. 5, 1957 |

FOREIGN PATENTS

| | | |
|---|---|---|
| 586,360 | France | Jan. 3, 1925 |
| 545,333 | Germany | Feb. 29, 1932 |
| 668,902 | Great Britain | Mar. 26, 1952 |
| 1,131,927 | France | Oct. 29, 1956 |